P. CARDONE, G. FUMAGALLI AND C. SURICO.
DOUGH CUTTING MACHINE.
APPLICATION FILED DEC. 2, 1919.
1,373,796.
Patented Apr. 5, 1921.
5 SHEETS—SHEET 3.
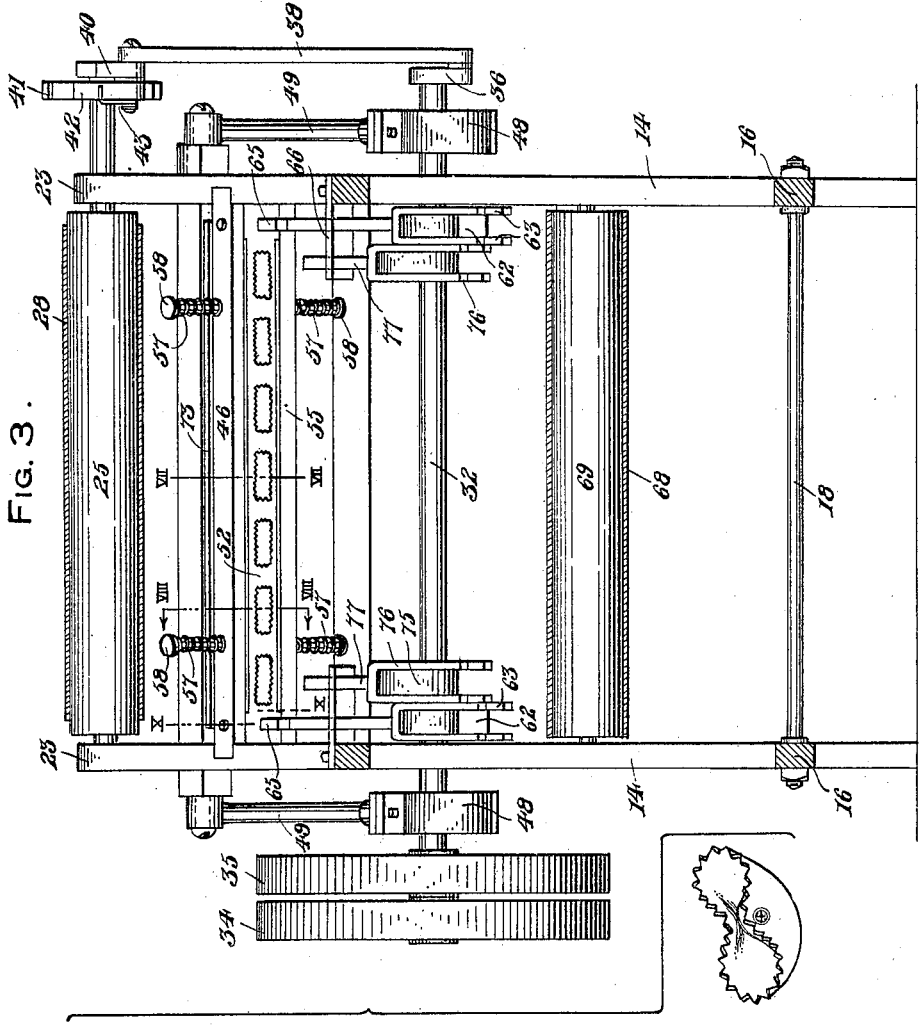
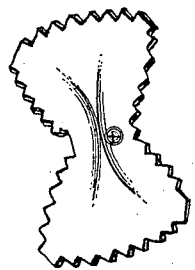
Fig. 11.
Inventors
P. Cardone
G. Fumagalli
C. Surico
By
Attorney

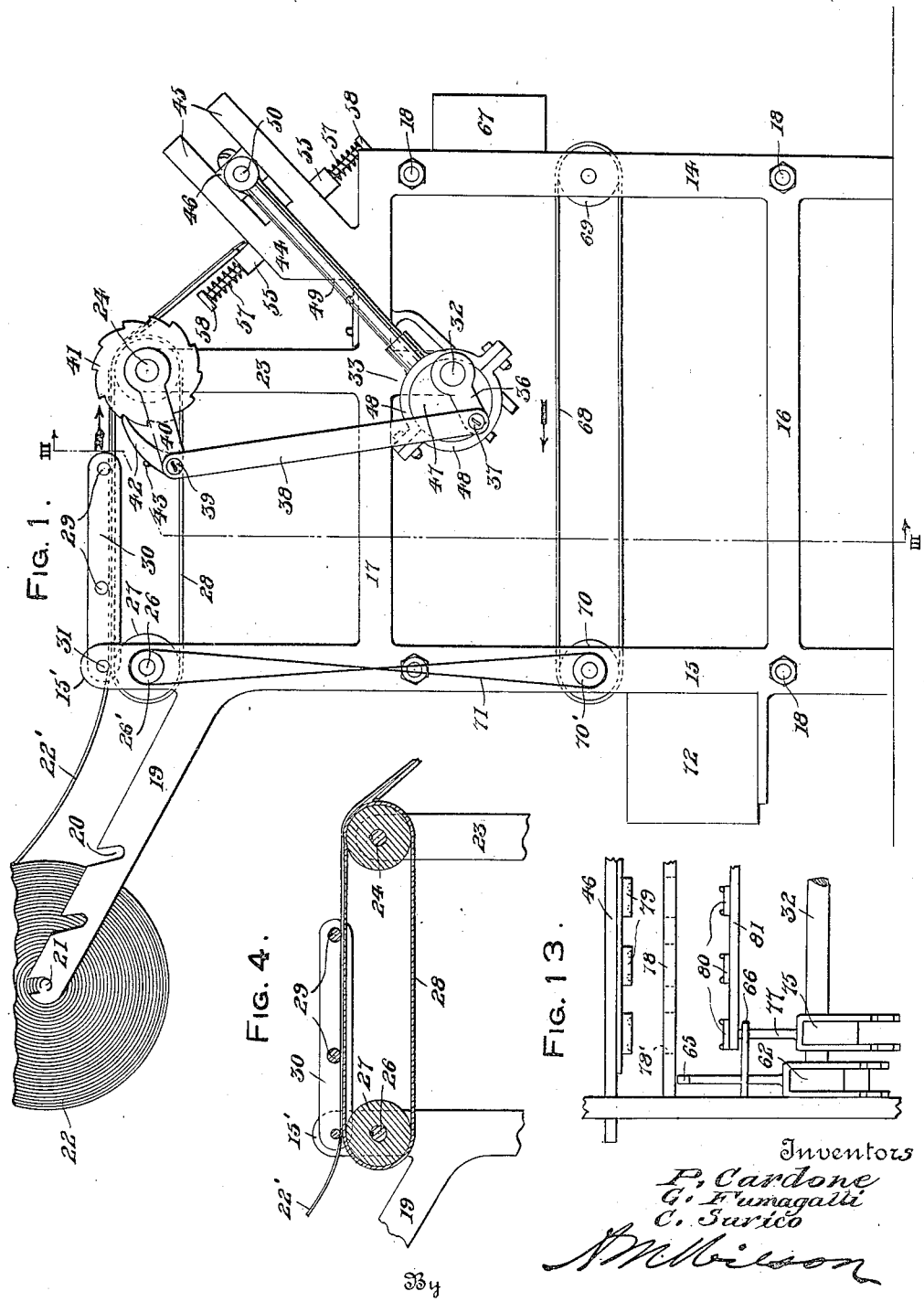

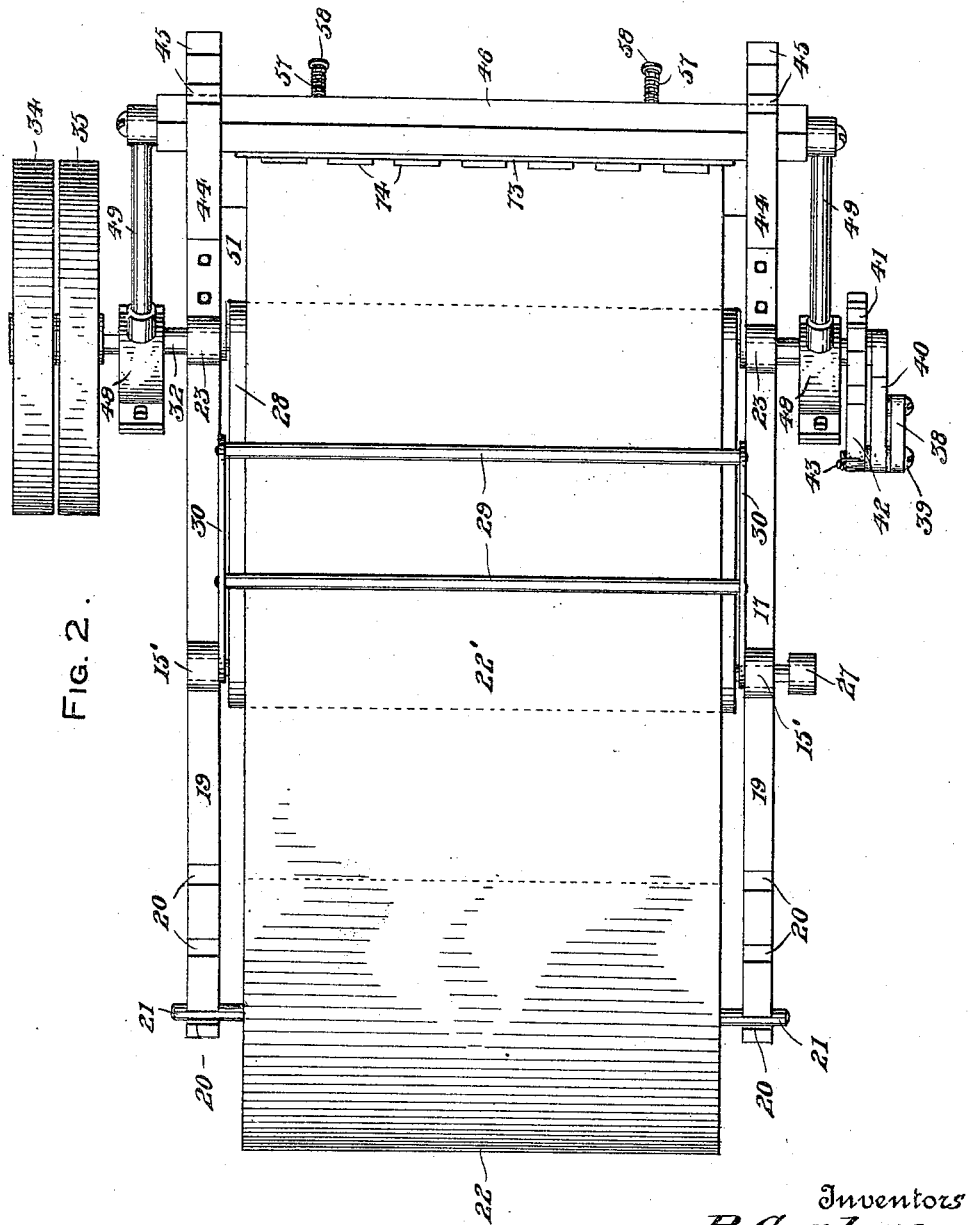

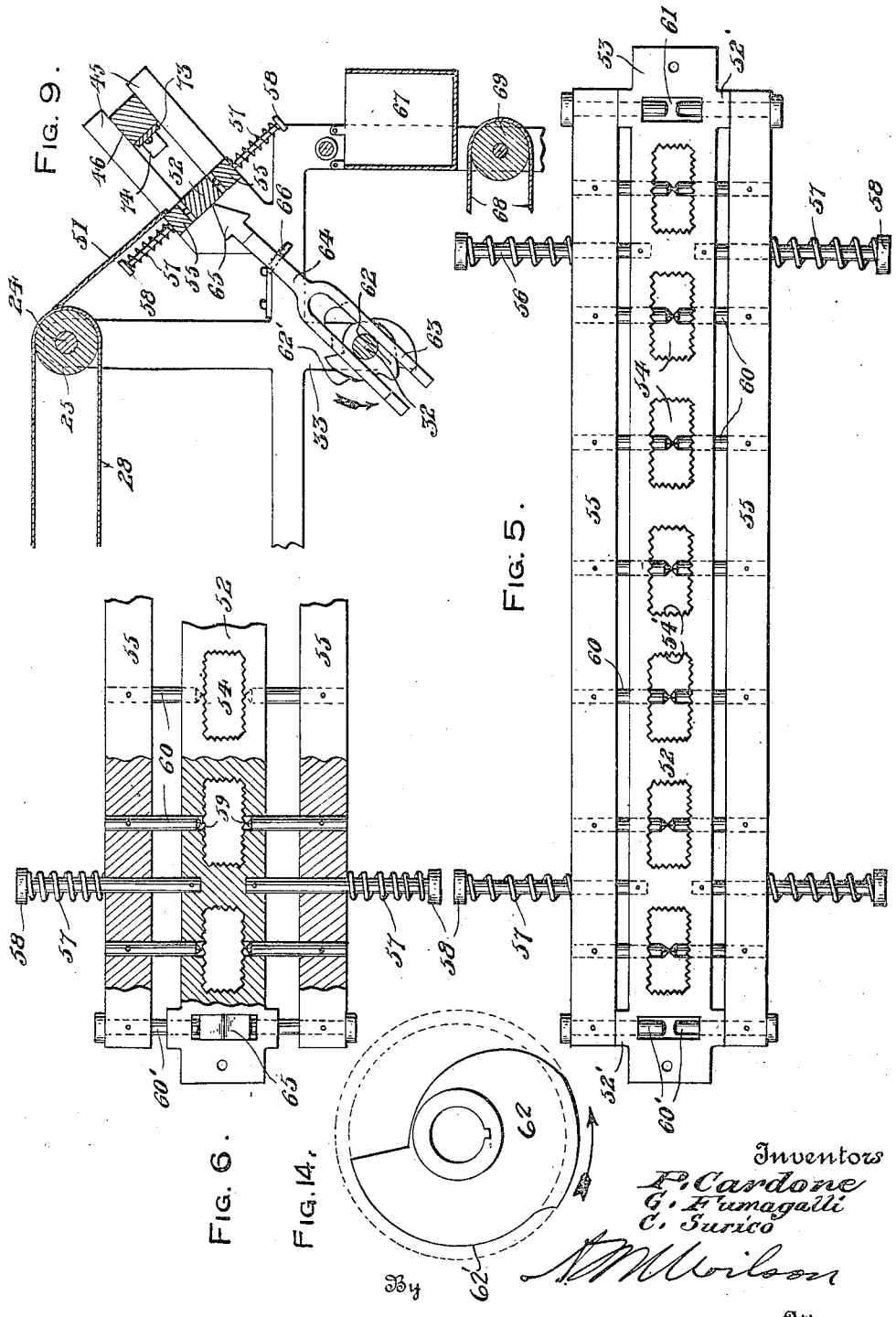

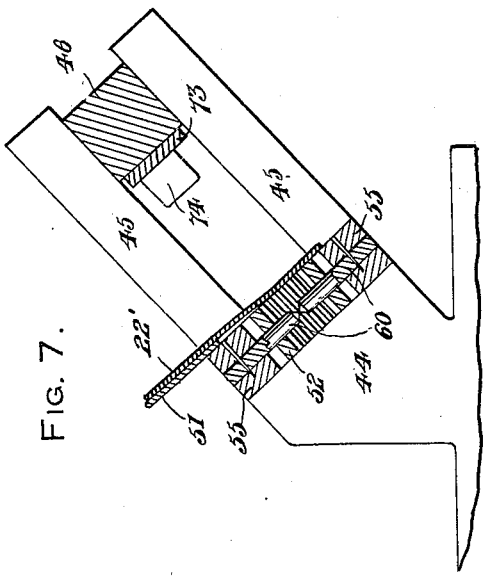
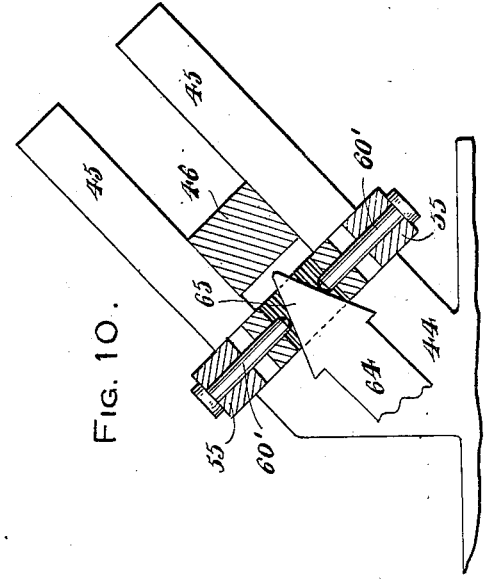
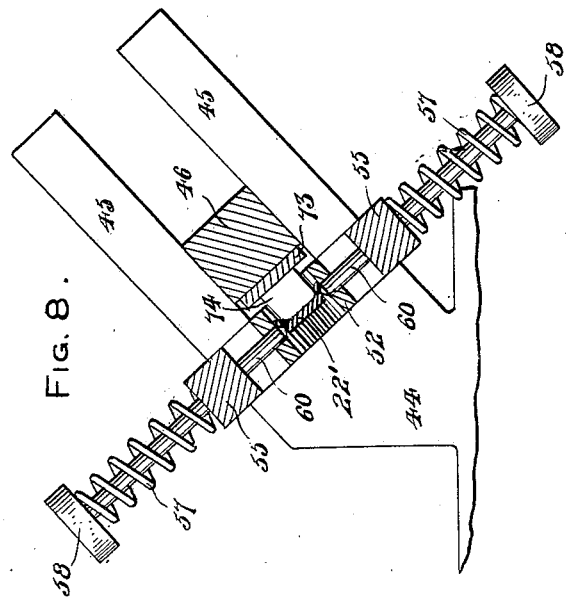
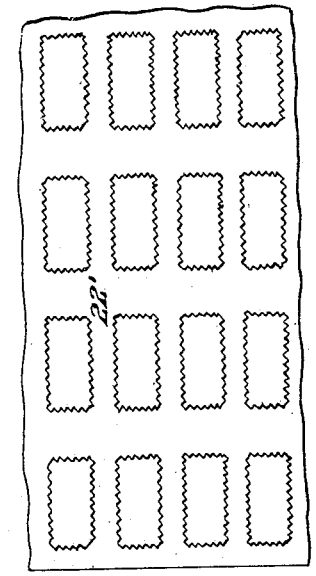

UNITED STATES PATENT OFFICE.

PAUL CARDONE, GIACOMO FUMAGALLI, AND CARMINE SURICO, OF NEW YORK, N. Y.

DOUGH-CUTTING MACHINE.

1,373,796.   Specification of Letters Patent.   Patented Apr. 5, 1921.

Application filed December 2, 1919. Serial No. 341,919.

*To all whom it may concern:*

Be it known that we, PAUL CARDONE, GIACOMO FUMAGALLI, and CARMINE SURICO, citizens of the United States of America, residing at New York, in the county of New York and State of New York, have invented certain new and useful Improvements in Dough-Cutting Machines, of which the following is a specification.

The primary object of the present invention resides in the provision of a machine for cutting dough and especially a machine for cutting dough into fanciful designs and shapes for the manufacture of noodles and the like, the machine embodying punching devices or dies adapted to form the novel designs of noodles from a relatively thin sheet of dough fed over the die plate.

In connection with the machine for cutting the different forms of noodles, an endless belt conveyer is provided for carrying the cut noodles from one end of the machine to the other and for delivering same into a receptacle, while another receptacle is provided at the forward end of the machine for the reception of the unused strip of dough for purposes of collecting the same for reworking.

In the preferred form of the present machine, a plate over which the sheet or strip of dough is passed, is provided with a plurality of fanciful openings through which the dough is forced by plungers or dies, but it is also intended that coöperating male and female die members may be positioned at opposite sides of the apertured plate for forming the design of noodle desired.

With the above and other objects in view, the invention consists in the novel form, combination and arrangement of parts herein fully described and shown in the accompanying drawings, wherein like reference characters indicate similar parts throughout the several views.

In the drawings,

Figure 1 is a side elevational view of a dough cutting machine constructed in accordance with the present invention illustrating the ratchet operating devices for the feed belt for the dough, Fig. 2 is a top plan view of the machine with a roll of dough supported therein and being fed therethrough, Fig. 3 is a vertical cross sectional view taken on line III—III of Fig. 1 showing the cam shaft and cams carried thereby for operating for shifting the presser bar devices, Fig. 4 is a fragmentary sectional view of the dough feeding belt with the guide rollers positioned thereabove, Fig. 5 is an enlarged top plan view of the forming plate and pin carrying bars removed from the machine, the pins being illustrated as contacting midway the side walls of the noodle forming openings, Fig. 6 is a fragmentary view, partially in section of the forming plate shown in Fig. 5, illustrating the presser pins completely retracted from the noodle forming openings, Fig. 7 is a fragmentary cross sectional view taken on line VII—VII of Fig. 3, through the forming plate and plunger head, showing a strip of dough passing over the forming plate and with the presser pins contacting midway of the noodle forming opening, Fig. 8 is a view similar to Fig. 6 taken on line VIII—VIII of Fig. 3, showing the plunger head with the die carried thereby lowered into the noodle receiving opening with the presser pins, partially projecting thereinto to prevent a complete passage of the cut noodle through the noodle forming opening, Fig. 9 is a fragmentary cross sectional view taken through the forming plate and plunger head and illustrating the cam shaft and cam carried thereby for operating the plunger rod for shifting the presser pin bars, the cams having stepped operating faces illustrated, Fig. 10 is a fragmentary sectional view taken on line X—X of Fig. 3, showing the spear head of the plunger rod engaging the pins carried by the pin shifting bars for removing the presser pins from the noodle receiving openings, Fig. 11 represents different forms of noodles to be cut by the machine, Fig. 12 represents a portion of a strip of dough after having passed through the machine with the noodles cut therefrom.

Fig. 13 is a fragmentary elevational view of a modified form of the invention showing male and female die members arranged at opposite sides of the forming plate, and Fig. 14 is a side elevational view of the spear operating cam removed from the power shaft.

The present invention has particular reference to a machine for cutting noodles and has for one of its objects to form a noodle with an uneven surface such as curved or corrugated whereby the noodles when used will have comparatively few flat faces for cohering to adjacent noodles during the cooking thereof. Referring briefly to the machine, there is provided a framework for supporting a power shaft upon which a plurality of separate cams are secured and from which cams, power is communicated to a plunger head carrying a plurality of dies for operation upon a strip of dough fed therebeneath and over a forming plate provided with the desired shape of opening therein. Tensioned presser bars are laterally shiftable relative to the forming plate and carry coöperating pins passing through the oppositely alined openings in the forming plate and contacting midway the side walls of the noodle receiving openings, others of said cams being employed for operating plunger devices for shifting the laterally movable presser pin carrying bars to remove the pins from the openings to permit a free passage of the noodles therethrough, the relative positions of the operating faces of said cams being positioned to cause a complete removal of the pins from the noodle receiving openings prior to the reception therein of the dies carried by the plunger head whereby when the section of dough is forced into said opening by said plunger head, said presser pins are permitted to move back into said openings to prevent the complete passage of the cut noodle through the openings in the forming plate, continued movement of the power shaft completely forcing the cut noodle down into alinement with the coöperating presser pins and subsequently elevating the plunger head and completely retracting the separating devices for the presser bars to permit said presser bars to close upon the forming plate with the presser pins pinching or bending the stamped noodle into the desired shape. The completely formed noodles in passing from the forming plate are received upon an endless conveyer directing the same to a point rearwardly of the machine into a receiving receptacle while the strip of dough with the punched openings therein continues in its passage over the forming plate and is received in a receptacle at the front end of the machine. Operating devices are also employed for feeding the dough in strip form through the machine synchronously with the operation of the plunger head so that an unpunched or plain strip of dough is fed over the forming plate with each elevating movement of the plunger head.

Referring more in detail to the accompanying drawings, and particularly to Figs. 1, 2, and 3, there is illustrated a noodle cutting machine embodying a framework formed of front and rear side legs 14 and 15 connected by bars 16 and 17 while the opposite front and rear legs respectively are connected by cross braces 18 arranged adjacent the upper and lower ends thereof. The upper end of each rear leg 15 carries a rearwardly directed upwardly inclined arm 19, the arms having sets of alined sockets 20 therein for the reception of the shafts 21 upon which the dough in rolled sheet formation as illustrated at 22 in Fig. 1 is received with the strip 22' of said roll being fed to the machine in a manner presently to appear. The connecting bars 17 of the front and rear legs 14 and 15 carry vertical arms 23 having journaled in the upper ends thereof, a horizontal shaft 24 having a drum 25 fixed thereto between the arms 23. Vertical extensions 15' are carried by the rear legs 15 and have journaled therein, the horizontal shaft 26 supporting the drum 27 between said extensions 15' while an endless belt 28 extends over the drums 25 and 27. The dough strip 22' in passing through the machine in first leaving the roll 22 is received on the upper section of the endless belt 28 and is maintained in contact therewith by the spaced rollers 29 journaled at their ends in opposite arms 30 pivotally mounted upon the rod 31 journaled at its ends in the leg extensions 15' as shown in Figs. 1, 2, and 4.

In order to cause the operation of the endless belt 28 and a consequent feeding of the dough strip 22', there is provided a power shaft 32 journaled transversely of the machine in hangers 33 depending from the connecting bars 17, the power shaft 32 carrying a loose pulley 34 and a fixed pulley 35 for the operation thereof. A crank arm 36 is keyed to the end of the shaft 32 while the outer end thereof is connected as at 37 to one end of a relatively long link 38, the other end of said link being connected as at 39 to the free end of another crank arm 40 journaled on the corresponding end of the shaft 24. A ratchet wheel 41 is secured on said shaft 24 adjacent the crank arm 40 while the pawl 42 tensioned as at 43 is maintained in constant engagement with the ratchet wheel 40 so that power may be communicated from the shaft 32 to the shaft 24 by the rotation of the crank arm 26 and the oscillation of the crank arm 40 through the medium of the connecting link 38 and the pawl and ratchet devices.

A guide frame 44 is carried by the forward ends of the connecting bars 17 and are bifurcated as at 45 at their outer ends for slidably receiving and guiding in its movement, the transverse plunger head 46. The reciprocating mechanism for the plunger head 46 includes a disk 47 eccentrically secured to the shaft 32 adjacent each end thereof and outwardly of the hangers 33, and each disk is inclosed by a sectional strip 48 having a pitman connection 49 with each end of the plunger head as at 50 so that rotary motion of the power shaft 32 through the eccentric disks 47 is converted into reciprocating motion for the plunger 46 by the pitman connections 49.

As the dough is fed forwardly by the endless belt 29, the same passes over an apron 51 extending from the drum 25 to the noodle forming plate 52, thus to conduct the strip of dough over the intervening space. End projections 53 are carried by the noodle forming plate 52 and are received between the bifurcated outer ends 44 of the supporting frame and are suitably retained therein. As illustrated in Fig. 5, the forming plate 52 is provided with a plurality of openings 54 rectangular in form with the faces of said openings corrugated as at 54', but it is to be understood that the openings 54 may be of any form desired such as oval, circular, square or diamond-shaped and it is intended to construct the machine with interchangeable forming plates. A presser bar 55 is arranged at each side of the forming plate 52 and the presser bars are mounted on rods 56 which are maintained in contact at their opposite ends, with lateral projections 52' of said forming plate by expansion coil springs 57 arranged between the heads of the rods 58 and the outer faces of the presser bars 55. Alined openings 59 are provided in the presser bar 52 preferably midway the opposite ends of the openings 54 and through which openings freely extend presser pins 60 carried by the presser bars, which pins contact each other as illustrated in Fig. 5 when the presser bars 55 are forced into engagement with the projections 52' of the forming plate by the springs 57. A transverse opening 61 is provided in the forming plates 53 adjacent each end thereof and into which slidably project pins 60' fixed to the presser bars 55, the pins being slightly spaced at their adjacent ends with the presser bars contacting the forming plate for purposes that will presently appear.

As illustrated in Figs. 3 and 9, the power shaft 32 has a cam 62 fixed thereto adjacent the inner face of each hanger 33, the cams 62 having the operating faces thereof stepped as at 62' and concentric with the shaft 32 and being positioned between the two pairs of depending legs 63 straddling the power shaft 32 and inclosing the cam, the upper ends of the legs 63 being connected to the plunger rod 64 carrying a spear head 65 at its upper end, the plunger rod 64 being guided in its vertical movements in response to the rotation of the cam 62 by the bracket arm 66 projecting from the brace bar 17 of the frame, the plunger rod 64 being supported by the cams 62 as clearly illustrated in Fig. 3. To effect a withdrawal of the pins 60 from the noodle forming opening 54, the shaft 32 is rotated to cause the cams 62 to elevate the plunger rods 64 and with said plunger rods, the spear heads 65 thereof as illustrated in Fig. 10 to enter the end openings 61 of the noodle forming plate 52 for engagement with the pins 60' carried by the presser bars 55 to project said pins 60' from the opening 61 with a subsequent movement of the presser bars 55 and the pins 60 carried thereby, the cams 62 operating to cause a complete removal of the pins 60 from said openings 54 and with a partial return of said pins to the openings prior to a complete return thereof to prevent the passage of an unpunched noodle therethrough.

As the punched dough strip 22' is fed over the noodle forming plate and forwardly of the machine, the same is received in the forwardly positioned box 67 and can be severed at the desired point and reworked for a subsequent passage through the machine. A conveying belt for the completed noodles is provided beneath the forming plate and extends from the front end of the machine to the rear end thereof and includes an endless belt 68 passing over rollers 69 and 70, the shaft for supporting the roller 70 having a pulley 70' connected to the end thereof over which a cross belt 71 passes, which belt also passes over a pulley 26' carried by the shaft 26 so that the endless belts 28 and 68 operate in opposite directions, both being driven by the pawl and ratchet devices 41 and 42 receiving power from the shaft 32, a receptacle 72 being arranged at the rear end of the endless belt 68 for receiving the noodles conveyed thereby.

A machine constructed in accordance with the details above enumerated operates in the following manner. The dough from which the noodles are made is rolled into a comparatively thin flat sheet of indefinite length, and of a width substantially to cover the forming plate 52 and is partially dried or lightly sifted with flour to prevent cohesion when wound into the roll 22 shown in Figs. 1 and 2, the roll 22 being carried by the rod 21 which is selectively received in alined openings 20 of the frame arms 19. The free end of the roll of dough is moved over the endless belt 28 to provide a feed strip 22', the strip 22' passing beneath the journaled rods 29 which rest thereon and hold the same in frictional engagement with the endless feed belt 28. A power belt working over the loose wheel 34 is shifted onto the fixed wheel 35 for rotating the power shaft 32, and such continuous rotary motion of the power shaft 32 communicates a step by step movement to the endless belt 28 through the medium of the crank arms 36 and 40 upon the power shaft 32 and drum shaft 24 respectively, and the connecting link 38, operating in conjunction with the pawl and ratchet wheel 42 and 41, respectively, the crank arm 36 being shorter than the crank arm 40 so that a continuous rotary movement of the crank arm 36 communicates an oscillatory movement to the crank arm 40 whereby the ratchet wheel is given a step by step movement. The drum 25 being fixed to shaft 24 moves therewith and imparts such intermittent movement to the endless belt 28 while the spring device 43 maintains the pawl in engagement with the ratchet wheel at all times. Through the medium of the eccentrically mounted disk 47 and the strap connection 48 between said disk and the pitman rod 49, the plunger head 46 is reciprocated between the bifurcations 45 of the forwardly extending bracket 44 and secured to said plunger head is a plate 73 carrying a plurality of punching dies 74 substantially equal in cross sectional area to the openings 54 in the forming plate 52, but being provided with plain surfaces. The dough strip 22' passes over the apron 51 and onto the forming plate 52 to overlie all of said openings 54. The descending movement of the punching die 74 with the plunger 46 engages the dough strip 22' for punching a section thereof into the opening 54 which punched section or noodle cut from the dough will have a peripheral edge similar to the corrugated face 54' of the forming plate opening, and as illustrated in Fig. 8, the presser pins 60 slightly project into the opening at this time to prevent a complete passage of the cut noodle through the opening, the punching die 74 extending slightly below the upper surface of the pins to assure the pins gripping the cut dough during a subsequent movement. Simultaneously with the lowering movement of the plunger head 46 and punching dies carried thereby, the plunger rods 64 are elevated by the cams 62 fixed to said power shaft 32 and engaging the lower ends of said plunger rods. When the plunger rods 64 are elevated, the spear heads 65 thereof enter the openings 61 in the ends of the forming plates 52 and by contacting the pins 60', move said pins outwardly of said openings with a like lateral movement of the side presser bars 55 fixed to said pins 60', whereupon the pins 60 during the initial rise of the plunger rods will be completely retracted from the interior of the openings 54 to permit a noodle retained in said openings by said pins to drop by its own weight upon the conveying belt 68. The step 62' in the working face of the cam 62 permits a slight retraction of the plunger rod 64 with the spear head 65 so that the presser pins 60 may slightly project into the openings 54 to prevent a subsequent piece of dough forced therein by the die plungers 74 from completely passing therethrough. The cams 62 and the eccentric disks 47 are positioned on the power shaft 32 so that the die plungers 74 in punching a piece of dough from the strip 22 forces said dough downwardly through the opening 54 in the forming plate to a position directly between alined presser pins 60 with the opposite edges of the punched noodle slightly overlying the adjacent ends of said pins so that when the plunger head is elevated by the eccentric disk 47 and the plunger rods 64 lowered by a release of the cams 62 to remove the spear heads 65 from the engaged pins 60', said presser bars 55 will by force of the springs 57 be permitted to move in contacting relations with respect to the ends 52' of the forming plate thus to permit the coöperating presser pins 60 entering the forming openings 54 for pinching or bending the noodle therebetween, and to form the type of noodle shown in Fig. 11. The punched strip 22' of the dough as illustrated in Fig. 12 is fed forwardly of the forming plate and is received in the box 67 and may again be reworked for repassage through the machine. The completed noodles in falling through the forming plate 52 by a release of the pins 60 will fall upon the conveyer belt 68 and as above described, be conveyed to the rear end of the machine for reception in the box 72. As above described, the pins 60 retain the pinched, pressed or folded noodle in the opening 54 in the forming plate until a subsequent descending movement of the plunger head 46 and the initial function of the cam 62 is completely to remove the presser pins 60 from said opening to permit the cut noodle to fall therethrough while the concentric stepped face 62' of the cam permits the presser pins 60 to be slightly projected into the openings 54 to prevent a newly punched or cut noodle from completely passing through the opening, with a subsequent complete projection of the pins in said openings.

While the openings 54 illustrated in Figs. 5 and 6 are of rectangular formation, the present invention also contemplates the substitution of forming plates provided with additional shaped openings such as an oval, or circular opening to provide the form of noodles illustrated in Fig. 11 and with an oval die plunger or conical die plunger to be carried by the plunger head. From the above detailed description of the invention, it is believed that the construction and operation of the machine will at once be apparent, it being noted that with the continuous rotation of the power shaft 32, the machine is continuous in its operation and through the feeding belt 28, an unpunched section of the dough strip 22' is fed to the forming plate 54 for engagement by the plunger head 46 and with each rise of the plunger rods 64 to remove the presser pins 60 from the forming plate openings 54, the finished noodle therein falls upon the conveying belt 68 for delivery to the rear end of the machine in the receptacle 72 while the punched strip of dough 22' is fed downwardly to the waste receptacle 67.

A modified form of the invention is shown in Fig. 13 and together with this figure, attention is directed to Fig. 3 which illustrates as having mounted on the power shaft 32, a cam 75 inclosed by depending legs 76 corresponding to the legs 63 with the upper ends of said legs connected to the plunger rod 77 and being guided in its movements by the bracket arm 66. The forming plate 78 shown in Fig. 13 may be of the same general design as illustrated in Fig. 5 of the preferred form, but in lieu of the punching dies 74, coöperating die members at each side of the forming plate 52 are provided, female die members 79 carried by the plunger head 46 are adapted to be lowered into the openings 78' in the forming plate while the male die members 80 carried by a plate 81 secured to the upper ends of the plunger rods 77 are moved upwardly into the openings 78' for coöperation with the female die members. In the operation of this form of the invention, the cams 62 operate as in the preferred construction, punching the dough strip to position a part thereof in the opening 78' for initial retention by the pins 60 while the male members 80 of the dies moving upwardly engage the bottom face of the punched section of dough for forming the noodle, and when the die sections 79 and 80 separate as in Fig. 13, the pins 60 move toward each other to bend or fold the noodle. During the initial operation of the cam 62, as in the preferred construction, a complete retraction of the presser pins is effected to discharge the noodle from the opening 78' with a subsequent projection of the pins into said openings for engagement with a new piece of dough forming the noodle that is received in the opening and as described in connection with the other form of the invention, the operation is continuous and identical as above described.

The invention is to be considered in its broadest aspect, and while the preferred forms are herein illustrated, it is to be understood that various parts thereof may be changed in details of construction or modified in any manner desired such as the substitution of forming plates for the manufacture of noodles of an infinitely different number of designs, methods of conveying the finished noodles from the machine and the apparatus for feeding the dough strip, all of which shall fall within the scope of the invention as hereinafter claimed.

What is claimed as new is:—

1. A dough cutting machine of the class described comprising a frame, a forming plate carried thereby and having a plurality of openings therein, means for progressively feeding a dough strip over the forming plate, a punching die coöperating with said forming plate openings, collecting means for the punched noodles, collecting means for the punched sheet of dough, and means projecting into the forming plate openings through the side walls thereof to prevent the complete passage of a piece of punched dough through the openings in the forming plate when initially received therein.

2. A dough cutting machine of the class described comprising a frame, a forming plate carried thereby and having a plurality of openings therein, means for progressively feeding a dough strip over the forming plate, a punching die coöperating with said forming plate openings, collecting means for the punched noodles, collecting means for the punched sheet of dough, means projecting into the forming plate openings through the side walls thereof to prevent the complete passage of a piece of punched dough through the openings in the forming plate when initially received therein, and means for operating the last named means extending between the forming plate and the power shaft.

3. A machine of the type described comprising a frame, a dough roll support carried thereby, a feeding device for the free end of said dough roll, and a noodle forming device supported on said frame forwardly of said feeding device, said noodle forming device including a forming plate having openings therein, a plunger head over said forming plate, plunger dies carried by said head for coöperating with said openings, means for reciprocating said plunger head, and means carried by opposite sides of said forming plate and extending through the side walls thereof and into the plate openings to prevent a complete passage of a punched section of the dough therethrough when first entering the opening.

4. A machine of the type described comprising a frame, a dough roll support carried thereby, a feed device for the free end of the dough roll, a power shaft journaled in said frame, connecting means between the power shaft and the feeding device, a forming plate having openings therein supported forwardly of the feeding device, plunger dies reciprocable above said forming plate, connecting means between the forming dies and the power shaft, presser bars tensioned at opposite sides of said forming plate, presser pins carried by said bars and slidably extending through the opposite side walls of the forming plate for contact at their adjacent ends intermediate of the upper and lower ends of the openings of the forming plate, means for shifting said presser bars and pins carried thereby operated from the power shaft, said last named means including cams fixed to said power shaft, plungers reciprocated by said cams, the upper ends of said plunger rods extending between spaced pins at the ends of said presser bars for engagement therewith to laterally shift the presser bars and to remove the coöperating pins from said openings.

5. A machine of the type described comprising a frame, a dough roll support carried thereby, a feed device for the free end of the dough roll, a power shaft journaled in said frame, connecting means between the power shaft and the feeding device, a forming plate having openings therein supported forwardly of the feeding device, plunger dies reciprocable above said forming plate, connecting means between the forming dies and the power shaft, presser bars tensioned at opposite sides of said forming plate, presser pins carried by said bars and slidably extending through the opposite side walls of the forming plate for contact at their adjacent ends intermediate of the upper and lower ends of the openings of the forming plate, means for shifting said presser bars and pins carried thereby operated from the power shaft, said last named means including cams fixed to said power shaft, plungers reciprocated by said cams, the upper ends of said plunger rods extending between spaced pins at the ends of said presser bars for engagement therewith to laterally shift the presser bars and to remove the coöperating pins from said openings, said cams having the working faces thereof stepped to cause an initial complete withdrawal of the pins from said opening and a subsequent partial projection of the pins into said opening to prevent a complete passage of the punched piece of dough therethrough with a subsequent complete insertion of said pins in the openings to fold the piece of dough therein.

6. A machine of the type described comprising a frame, a dough roll support carried thereby, noodle forming devices arranged at the forward end of the machine, means for conveying the dough strip from the roll to the noodle forming devices, and a power shaft, said noodle forming devices including a forming plate having a plurality of openings therein, dies vertically movable above the openings in said forming plate and adapted to punch a section of the dough strip thereinto, operative connections between the vertically movable dies and the power shaft and means slidably extending through the opposite walls of the forming plate and operated by said power shaft for retarding the passage of a punched section of dough through the forming plate openings, and subsequently operating to permit a complete passage of the punched section therethrough.

7. A machine of the type described comprising a frame, a dough roll support carried thereby, noodle forming devices arranged at the forward end of the machine, means for conveying the dough strip from the roll to the noodle forming devices, a power shaft, said noodle forming devices including a forming plate having a plurality of openings therein, dies vertically movable above the openings in said forming plate and adapted to punch a section of the dough strip thereinto, operative connections between the vertically movable dies and the power shaft, means slidably extending through the opposite walls of the forming plate and operated by said power shaft for retarding the passage of a punched section of dough through the forming plate opening, and subsequently operating to permit a complete passage of the punched section therethrough, said means adapted during the operation thereof to pinch or fold the section of dough retained in said openings.

8. A machine of the type described comprising a noodle forming plate, means for forcing a section of dough through said plate and means associated with said plate and slidably extending through the side walls thereof to prevent the dough from completely passing therethrough when initially received therein, said means subsequently operating to release the retained section of dough.

9. A machine of the type described comprising a noodle forming plate, means for forcing a section of dough through said plate, means associated with said plate and slidably extending through the side walls thereof to prevent the dough from completely passing therethrough when initially received therein, said means operating to fold the retained section of dough therein and subsequently operating to release the retained dough.

In testimony whereof we affix our signatures.

PAUL CARDONE.
GIACOMO FUMAGALLI.
CARMINE SURICO.